United States Patent

[11] 3,569,825

| | | | |
|---|---|---|---|
| [72] | Inventor | Pedro Lilienfeld Lexington, Mass. | |
| [21] | Appl. No. | 797,048 | |
| [22] | Filed | Feb. 6, 1969 | |
| [45] | Patented | Mar. 9, 1971 | |
| [73] | Assignee | GCA Corporation Bedford, Mass. | |

[54] CORONA DISCHARGE PLASMA OSCILLATION GAS TRACE DETECTOR
16 Claims, 3 Drawing Figs.

[52] U.S. Cl. .................................................. 324/33, 315/111, 331/94
[51] Int. Cl. ...................................................... G01n 27/00
[50] Field of Search ............................................ 324/33, 0.5, 58, 58.5, (Inquired); 315/111, (Inquired); 331/3, 94

[56] References Cited
UNITED STATES PATENTS
3,484,602  12/1969  McIlraith ..................... 324/33X Primary Examiner—Michael J. Lynch
Attorney—Kenway, Jenney and Hildreth ABSTRACT: A method and apparatus for sensing and measuring the presence and amount of a specific gaseous component in a volume of gas as well as measuring gas density over a range of densities. The gas under test is subjected to an inhomogeneous electric field to create a plasma having characteristic oscillation frequencies. By comparison with previously charted data or by comparison with the output of a simultaneously excited reference gas, the presence and concentration of the specific component may be evidenced by the plasma oscillation frequencies.

PATENTED MAR 9 1971

3,569,825

INVENTOR.
PEDRO LILIENFELD

BY Kenway, Jenney & Hildreth

ATTORNEYS

3,569,825

CORONA DISCHARGE PLASMA OSCILLATION GAS TRACE DETECTOR

SUMMARY OF THE INVENTION

My invention relates generally to the sensing and analysis of the presence and amount of specific gaseous components in a volume of gas. Density and other parameters of a selected gaseous component of a gaseous composition may be also be measured. The invention is based upon and utilizes the phenomenon of plasma oscillation manifested by an ionized gas under certain conditions in an electric field. As is known, a plasma is a region in an ionized gas which contains very nearly equal numbers of positive and negative charges. The charged ions and electrons can be made to oscillate coherently under specific applied field conditions. The exact nature and causes of such plasma oscillation are not precisely known and are still the subject of technical investigation. For present purposes, however, it is sufficient to note that in an electric field of relatively low intensity, the resultant oscillations are of random character and lack any discernible phase relationship. I have found, though, that if the intensity of the electric field is increased, a critical level is reached at which coherent oscillation of the ions suddenly takes place.

Moreover, I have determined that the oscillation frequency varies with, and is dependent on, the composition of the gas in the plasma. Under identical conditions (pressure, temperature, electric field intensity, etc.) the ions of gases of different compositions will oscillate at correspondingly different frequencies within the plasma to provide useful data in electrical form on the gases. Such data may, however, be even more reliably obtained by measuring and comparing the oscillation frequency of a plasma under test with that of a reference plasma. To compare the plasma oscillation frequency of such a test sample to that of a standard or reference gas, both gases may be ionized within controlled electric fields of identical gradients and their coherent oscillation frequencies may then be measured and compared. Any difference in the oscillation frequencies of the two plasmas will reflect the presence in the sample of a specific gaseous component not contained in the reference gas.

My invention may be embodied in a relatively simple structure capable of easy and convenient operation and may be used to detect and analyze a wide variety of gaseous components. Thus, it is capable of substitution for the rather sophisticated and diverse types of equipment now needed for monitoring various gaseous parameters. The compact and simple nature of devices made in accordance with my invention does not detract from their reliability, permitting their use in probing the outer limits of the earth's atmosphere where the likelihood of malfunction must be minimal.

As a specific example of such an application of my invention, one may construct a stratospheric hygrometer to measure water vapor content in a rarefied gas in the upper atmosphere of the earth. In this, as in many other possible applications, presently known apparatus tends to be complex and difficult to operate. Frost-point hygrometers, for example, are frequently employed for sensing water vapor which has been frozen out on a cool surface exposed to the rarefied atmosphere. The presence of the frozen layer may be detected by light scattering, alpha particle transmission, etc., the water vapor content being derived from the temperature measurement of the cooling surface when the frozen layer appears or is maintained by feedback. However, such systems are cumbersome, slow in response, prone to contamination and occasionally unreliable depending on the frost-point temperature. My invention permits a much simpler approach to such measurements and is more versatile than the frost-point device or other known apparatus in that it may be used to detect any specific trace, component or contaminant in a gas sample quickly, efficiently and reliably.

An illustrative embodiment of my invention for the special purposes of water vapor sensing and measurement includes a pair of discharge cylinders through each of which a wire electrode extends axially. Ambient gas is drawn directly into one cylinder, but is passed through a trap or filter before entering the other cylinder. The trap or filter is designed to remove substantially all water vapor. Radially inhomogeneous electric fields of identical gradient are set up in both cylinders to generate plasmas from which the above-mentioned coherent oscillations may be derived. In a preferred system, the difference or ratio of frequency of the oscillations is measured and the presence and concentration of water vapor in the unfiltered discharge cylinder is thus determined. Of course, the same general system with appropriate filters or contaminant traps can be similarly used to detect and measure the concentration of any specific trace gas.

More broadly, my invention is concerned with establishing coherent plasma oscillations within a gas by applying an electric field in such a manner that the gas in a stressed region is ionized and oscillations are produced. The geometrical arrangements of electrodes for producing the electric field are not critical nor is the system of acquiring data. Identification of the unknown sample or of certain of its qualities purely by its plasma oscillation frequency or frequency spectrum rather than by the above-mentioned filtration and comparison with a reference is entirely feasible when characteristic plasma frequencies or spectra have been previously determined and charted.

Obviously, applications of my invention are not limited to the environment of the earth's upper atmosphere. In fact, the invention may be embodied in a useful tool wherever it is desired to monitor or analyze the composition of a gas. Where gas density is not naturally low, available and well known vacuum equipment is used to reduce the density and thus to enable coherent plasma oscillations to be generated.

It is the principal object of my invention to utilize the phenomenon of coherent plasma oscillations for trace gas analysis.

It is another object of my invention to simplify methods and apparatus for detecting the presence of a particular gaseous component.

It is a further object of my invention to provide a gas analyzer having a minimal response time and a high degree of accuracy.

To provide a better understanding of my invention there appears below a detailed description of embodiments of that invention which should be read with reference to the accompanying drawing in which.

Figure 1:
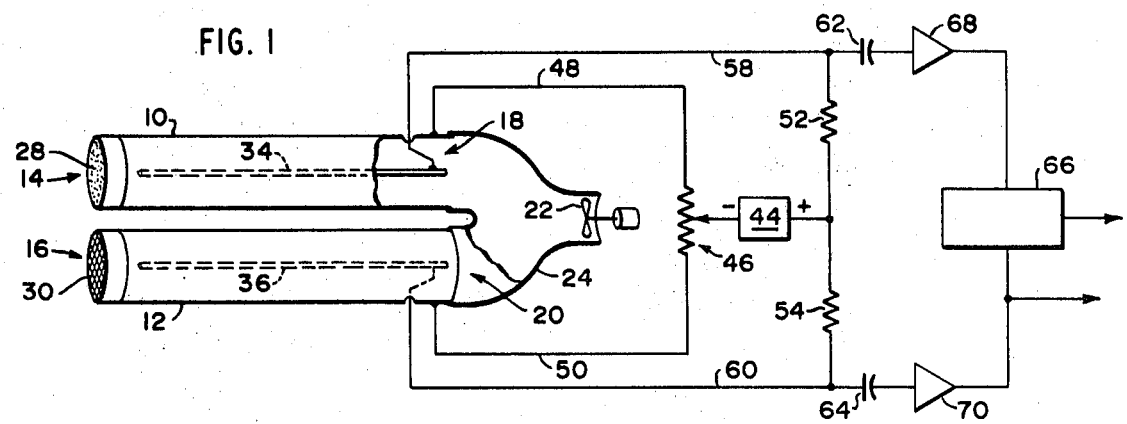
FIG. 1 is a schematic showing of one form of my invention for use at reduced or stratospheric pressures.

In FIG. 1 there may be seen a pair of discharge cylinders 10 and 12 having inlet ends 14 and 16 and exit ends 18 and 20 respectively. The cylinders may be composed of any one of numerous conductive materials. The exit ends 18 and 20 of the cylinders 10 and 12 may be coupled to a low-power blower or fan 22 by any convenient means such as a header 24. The blower 22 draws air or other ambient gas simultaneously through the cylinders 10 and 12 to effect a continuous sampling of the ambient gas and to permit continuous monitoring of any changes in the characteristics of the ambient gas.

The inlet ends 14 and 16 of the cylinders 10 and 12 should be disposed reasonably close to each other to insure that the samples of the ambient gas inducted into the cylinders 10 and 12 are substantially identical. Also, of course, the cylinders 10 and 12 should be of the same cross-sectional dimensions so that the flow rates of the gases are the same.

To permit the use of a reference standard to which the gas under investigation may be compared, one of the cylinders, such as the cylinder 10 may be fitted with a suitable filter 28 at its inlet end 14. The filter 28 is chosen for its capability to absorb, trap, or otherwise eliminate a particular gaseous component so that the gas drawn through the cylinder 10 will be substantially free of the particular component. For example, when my device is used as a hygrometer, to measure the water vapor content of the ambient gas, the filter 28 may be composed of any number of commercially available hygroscopic materials such as, for example, phosphorus pentoxide.

The gas drawn through the other cylinder 12, being unfiltered, is of ambient composition and concentration. Thus, the gases in the cylinders 10 and 12 will be identical except that the cylinder 10 will contain gas that is substantially free of the gaseous component which has been filtered out.

The filter 28 at the inlet 14 of the cylinder 10 may impede, to some extent, free flow through that cylinder. In such circumstances, to equalize flow rates through the two cylinders, a flow resistance equalizer 30 presenting an impedance comparable to that of the filter 28 is fitted to the inlet end 16 of the cylinder 12. An axial electrode 34 which may be a simple wire insulated from and running the length of the cylinder 10 and an axial electrode 36 similarly disposed in the cylinder 12 are provided to permit the application of electric fields to the contents of the cylinders. The electric fields may be generated by a suitable DC high voltage source 44, the negative terminal of which is connected to a balancing potentiometer 46. The fixed terminals of the potentiometer are connected directly through the lines 48 and 50 to the cylinders 10 and 12 respectively. The positive terminal of the source 44 is connected to the axial electrodes 34 and 36 by way of the resistors 52 and 54 respectively. With the application of voltage, electric fields are set up in each of the cylinders 10 and 12. The intensity of the fields is made sufficient to produce a highly stressed ionized sheath about each of the axial wire anodes 34 and 36 and coherent plasma oscillations are generated. The oscillation signals are picked up by the wire anodes 34 and 36, and conducted by the lines 58 and 60 to capacitors 62 and 64 by which they are coupled to a frequency difference or frequency ratio analyzer 66. Amplifiers 68 and 70 may be interposed between the capacitors and the analyzer 66 to increase the strength of the relatively weak signals. The resistors 52 and 54 are effective to isolate the signals from one cylinder from those of the other permitting the use of a common high voltage power supply. The frequency analyzer 66 may be arranged to provide a readout signal of the frequency difference $(f_2-f_1)$, the frequency ratio $(f_2/f_1)$, or the frequency spectrum of each component, this signal being a function of the presence and concentration of the gaseous component under investigation.

By way of example, some representative values for the electrical components in the circuit may be as follows: Potentiometer 46, 1 Kilohm; Resistors 52 and 54, 1 Megohm; Capacitors 62 and 64, 500 uuf; and Voltage Supply 44, 500-−2000 volts DC.

Figure 2:
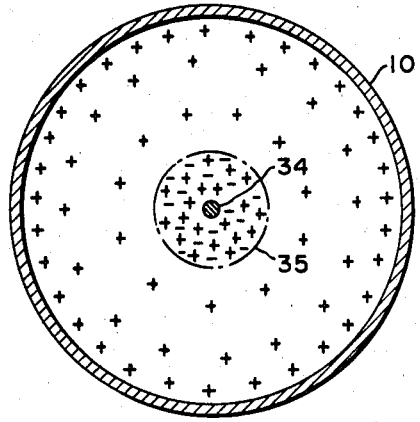
FIG. 2 shows in cross section one of the cylinders of the apparatus of FIG. 1.

In FIG. 2, a typical electric charge distribution formed between the cylinder 10 and the wire anode 34 is shown. The applied voltage should be of a magnitude sufficient to ionize the gas within the cylinder above its oscillation threshold and to generate the desired coherent plasma oscillations. Among the variables affecting the potential required to reach the oscillation threshold are the composition of the gas, the pressure of the gas within the cylinder and the radial cross-sectional dimensions of the cylinder. Interrelated factors influence the oscillation threshold; for example, a greater potential necessarily must be applied between the cylinder 10 and the wire electrode 34 when the gas is of an increased density and similarly if the radial distance between the electrode and the internal surface of the cylinder 10 is increased. Conversely, lowering the pressure or density of the gas or reducing the radial distance between the cylinder 10 and the electrode 34, permits the use of a lower potential to generate the coherent plasma oscillations. However, I have obtained quite satisfactory results with cylinders of conductive material such as aluminum having an internal diameter of 61 cm. and axial electrodes of material such as Nichrome of about .0125 cm.

diameter. The gas within the cylinders was maintained at a pressure ranging between 1 and 25 mm. Hg and DC voltages of the order of 500 to 2000 volts were found adequate to produce the desired oscillations.

Referring to FIG. 2, the intensity of the electric field varies inversely with the radial distance from the wire electrode 34, the field intensity being significantly higher about the wire anode 34 than at the inner surface of the cylinder 10. Thus, the gaseous region in proximity to and surrounding the wire electrode 34 will be highly stressed and more fully ionized than more remote outward gaseous regions. The region immediately about the electrode 34 constitutes a plasmic sheath 35 which liberates excess energy in the form of light and is visible as a glow sheath. The gaseous region surrounding the sheath 35 is not in a plasmic state and is not stressed to the same degree as the sheath 35. Hence, the positive ions in the annular, nonplasmic region tend to collect about the inner surface of the cylinder 10.

It is believed that the coherent plasma oscillations of interest here are generated within the plasmic sheath 35 and their frequency has been found to be of the order of $10^5$ kHz. in frequency. This is a considerably lower frequency than that of electron oscillations which have been observed in the prior art, such oscillations generally being of the order of $10^9$ kHz. The relatively low range of oscillation frequencies suggest that the oscillations are those of more massive ions and not of electrons.

A null calibration may be employed prior to sampling tests to assure that the electric fields applied to the cylinders 10 and 12 will be identical. Identical gaseous compositions are drawn into the cylinders 10 and 12 and the potentiometer 46 is adjusted until identical plasma oscillation frequencies are indicated by the readout of the frequency analyzer 56. This method of calibration is self-correcting and compensates for differences such as variations in the cross-sectional dimensions of the cylinders as well as other variables in the system.

Figure 3:
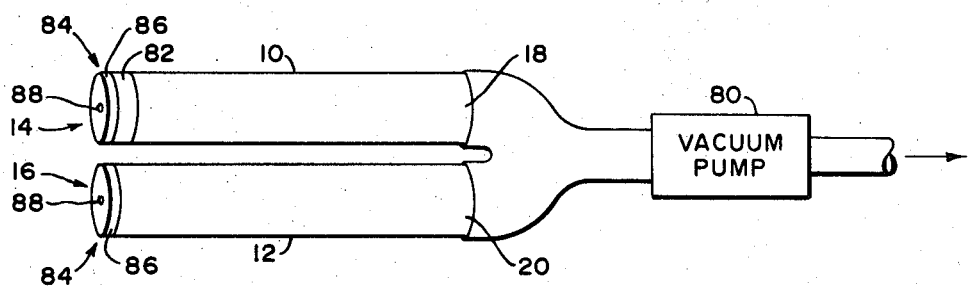
FIG. 3 is an illustration of my invention as adapted to analyze the composition of nonrarefied gases.

Although my invention has been described in connection with analysis of the gaseous composition in the earth's upper atmosphere, it is not by an any means restricted to such use, but may be arranged to monitor and analyze gases under a wide variety of conditions. As an obvious example, one may detect the presence of potentially harmful gases, such as carbon monoxide. A system for such purposes is shown in FIG. 3. Should pressures be such as to require their reduction, I utilized a vacuum pump 80 connected to the exit ends 18, 20 of the cylinders 10 and 12 to maintain pressure within the cylinders at a suitable level. The inlet end 14 of the reference cylinder 10 is provided with a filter 82 composed of any one of several known materials for excluding carbon monoxide gas from the test cylinder. In addition, the inlet ends of both cylinders should be provided with flow restricters 84, which may be nothing more than a simple cap 86 in which a pinhole 88 is formed. The flow restricter 84 combines with the vacuum pump 80 to hold the gases in the cylinders to be held at a suitable reduced pressure.

As has been noted, the fact that each particular gaseous composition which is ionized within one of the cylinders under predetermined conditions can be made to display a characteristic plasma oscillation frequency, makes it possible, through experimentation to prepare correlation charts and then identify directly a single sample of particular gaseous compositions under given conditions. As an example, of another simple and straightforward application of the invention, the frequency of the output of a cylinder containing a gas of known composition is a function of density of the cylinder contents and this fact permits density measurements to be made.

Needless to say, the structures embodying the invention and their applications described above are only exemplary. The essential condition for the practice of the invention is the creation of an inhomogeneous electric field in a gas whereby characteristic plasma oscillation signals are generated. The wire-cylinder geometry, the parallel disposition of cylinders, the use of a blower and myriad other details are not essential to the practice of the invention because the basic objectives are attainable with the use of other known components which will suggest themselves to those skilled in the art upon their reading of the foregoing. The invention should be limited only by the spirit and scope of the appended claims.

I claim:

1. A method of analyzing a test gas comprising the steps of:
   sampling said test gas;
   creating a first inhomogeneous electric field in said test gas;
   increasing the strength of said electric field to produce coherent plasma oscillations; and
   measuring the frequency of said coherent plasma oscillations to provide a data characteristic of said test gas.

2. A method of determining the composition of a test gas as defined in claim 1 further comprising:
   simultaneously sampling a reference gas of known composition;
   creating a second inhomogeneous electric field similar to said first electric field in said reference gas;
   increasing the strength of said second electric field to produce coherent plasma oscillations in said reference gas; and
   comparing the oscillation frequency of said reference gas with the oscillation frequency of said test gas whereby to provide an indication of the composition of said test gas.

3. A method as defined in claim 2 wherein the step of comparing the oscillation frequency of said reference gas with that of said test gas includes determining the frequency difference between the oscillation frequency of said reference gas and that of said test gas as a function of the presence and concentration of a component of said test gas.

4. A method as defined in claim 2 wherein the step of comparing the oscillation frequency of said reference gas with that of said test gas includes determining the frequency ratio between the oscillation frequency of said reference gas and that of said test gas as a function of the presence and concentration of a component of said test gas.

5. A method as defined in claim 2 wherein the step of sampling said reference gas includes the step of sampling ambient gas and the step of sampling said test gas includes the steps of sampling said ambient gas and eliminating a specific gaseous component therefrom.

6. A method as defined in claim 1 and further including the step of reducing the pressure of said test gas to a predetermined pressure during the sampling thereof.

7. A method as defined in claim 2 and further including the steps of reducing the pressure of said test gas and of said reference gas to a predetermined pressure during the sampling thereof.

8. Apparatus for analyzing the composition of a test gas comprising:
   means for ionizing said test gas to a plasmic state at which coherent plasma oscillations at a frequency characteristic of said test gas are generated; and
   means for measuring the frequency of said coherent plasma oscillations to provide an indication of the composition of said test gas.

9. Apparatus as defined in claim 8 wherein said means for ionizing said test gas comprises: means for applying an inhomogeneous electric field to said test gas, at least a portion of said field being of an intensity sufficient to produce said plasmic region and coherent plasma oscillations.

10. Apparatus as defined in claim 8 and further comprising:
    means for ionizing a reference gas of known composition under identical conditions as those for ionizing said test gas to produce a reference plasmic region within said reference gas and coherent plasma oscillations at a frequency characteristic of said reference gas; and
    means for comparing the frequencies of oscillation of said reference gas plasma and said test gas plasma to provide an indication of the composition of said test gas.

11. Apparatus as defined in claim 10 wherein each of said means for ionizing said gases comprises:
    a container for one of said gases;
    an electrode disposed within said container;
    means for applying a DC potential across said container and said electrode; and
    means for controlling said applied potential to generate a field of predetermined gradient within said container.

12. Apparatus as defined in claim 8 and further comprising: means for rarefying said test gas prior to ionizing an said test gas.

13. Apparatus as defined in claim 10 wherein said means for ionizing said reference gas and said test gas comprises:
    a pair of containers, each of said containers having an inlet end and an outlet end;
    means for inducting said reference gas into one of said containers;
    means for inducting said test gas into the other of said containers;
    an electrode disposed within each of said containers;
    a source of DC potential;
    means for applying said DC potential across each of said containers and its associated electrode to produce said plasmic regions and coherent plasma oscillations; and
    means for comparing the plasma oscillation frequencies of said reference gas and said test gas in said containers.

14. Apparatus as defined in claim 13 and further comprising: means connected to said containers for rarefying said gases to a predetermined pressure.

15. A method of ann analyzing the composition of a gas comprising:
    subjecting said gas to an electric discharge gap defined by a pair of electrodes;
    applying a nonuniform electric field across said discharge gap, said field being of a gradient such that the region about one of said electrodes is highly stressed to a degree wherein coherent plasma oscillations, characteristic of said gas, are generated; and
    measuring the frequency of said oscillations.

16. Apparatus for analyzing the composition of a gas comprising:
    a pair of electrodes arranged to define an electric discharge gap therebetween;
    means for applying a nonuniform electric field across said discharge gap, thereby to subject said gas to said electric field when said gas occupies said discharge gap, said field being of a gradient such that the region about one of said electrodes is highly stressed to a degree wherein coherent plasma oscillations, characteristic of said gas, are generated; and
    means for measuring the frequency of said oscillations.